Patented July 4, 1933

1,917,089

UNITED STATES PATENT OFFICE

WILLIS A. BOUGHTON, OF CAMBRIDGE, MASSACHUSETTS

INORGANIC LUBRICANT AND PROCESS OF PRODUCING THE SAME

No Drawing.    Application filed June 28, 1930. Serial No. 464,714.

My invention relates to the production of inorganic lubricants, and it consists in the product hereinafter described, and in the steps taken to produce the same.

Lubricants may be classified into two general classes: (1) those in which the constituents are partly or wholly organic and (2) those entirely inorganic in nature. The first group comprises almost all known lubricants of commerce and general use, while examples of members of the second group are rare.

Among the known inorganic lubricants are (A) mercury and its amalgams, (B) mixtures of solids, such as graphite, or talc, and liquids such as water, (C) phosphoric acid lubricants including moistened phosphorus pentoxide ($P_2O_5$), 85% orthophosphoric acid ($H_3PO_4$), and various mixtures comprising chiefly substances containing the orthophosphate radical ($PO_4$). It is with an improvement in lubricants of Class C that the present invention deals.

Lubricants in Class C thus far prepared have temporarily excellent lubricating properties, especially between ground glass surfaces. But all such, as far as I am aware, have the unfortunate property of being highly hygroscopic. As a result they quickly absorb water from the air, and become thin and of correspondingly lower lubricating value.

An object of my invention is to provide an inorganic lubricant which is not open to the objection of being markedly hygroscopic or deliquescent, and which, therefore, retains its efficiency under circumstances in which a deliquescent or hygroscopic lubricant would quickly lose its efficiency.

A further object of the invention is to provide a lubricant of the type mentioned which is insoluble in many organic solvents, and which, therefore, can be used in systems involving these solvents, whereas the ordinary organic type of lubricant dissolves rapidly under the same conditions.

A further object of the invention is to provide an inorganic lubricant which, while having the advantage of not being deliquescent in normal atmosphere, at the same time is water soluble, and so can readily be removed by washing with water when it is desired to remove it.

A further object is to provide a novel process for producing the inorganic lubricant.

Other objects and advantages will appear in the following specification and the novel features of the invention will be particularly pointed out in the appended claims.

In carrying out my invention I make use as a chief constituent of the lubricant, metaphosphoric acid $HPO_3$, commonly known as glacial phosphoric acid, or its alkali metal salt, such as sodium metaphosphate $NaPO_3$, in water soluble form, such as that prepared by heating monosodium dihydrogen phosphate to quiet fusion at redness, when, as is well known, the following chemical reaction takes place.

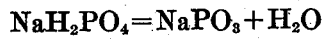
$$NaH_2PO_4 = NaPO_3 + H_2O$$

These substances alone, dissolved in water, furnish solutions of the type that when heated lose most of the contained water below 100° centigrade as usual, but retain some water, which they give off only slowly as the temperature is increased. This retention of water is so marked that red heat may be required to drive off all the stubbornly held water molecules. These solutions, when thus heated, become first sirupy and then heavily viscous as the water content decreases. They are not markedly hygroscopic. Thus they alone form useful lubricants.

I have discovered further, however, that admixture of borate radical increases the desirable properties somewhat, and a small amount of orthophosphoric acid appears to effect some further improvement. For the sake of simplicity I shall occasionally refer to metaphosphoric acid and its salts alike as metaphosphates (the acid being considered as hydrogen metaphosphate); and similarly I shall call boric acid and its salts borates.

Typical formulas for such improved phosphoric acid lubricants are as follows:

1. 100 grams of water-soluble sodium metaphosphate are dissolved in 500 cc. of water and 20 grams of sodium borate are added and dissolved. The solution is then boiled to a volume of about 150 cc., and 10 cc. of 85% orthophosphoric acid is added. The mixture is then boiled until the boiling temperature is about 108° C. when it is allowed to cool.

2. In exactly the same way an aqueous solution of 100 grams of glacial phosphoric acid, 2 grams of boric acid and 1 cc. of orthophosphoric acid is boiled until the boiling temperature is about 122° C. and cooled.

Such viscous fluids have excellent lubricating properties. They do not deliquesce in normal atmosphere. They are insoluble in many organic solvents such as benzol or naphtha and so can be used in systems involving these solvents whereas the ordinary organic type of lubricant dissolves rapidly under the same conditions. They are water soluble and so can be readily removed by washing with water.

The examples given above are merely for the sake of illustration, since it is obvious that these proportions might be changed without departing from the spirit of the invention. Thus potassium metaphosphate may be used in place of sodium metaphosphate, or the secondary constituents may be omitted or replaced to suit special needs. In all cases however, I find that the metaphosphate compound should be the chief constituent.

I claim:

1. A viscous mixture of phosphoric and boric acids.

2. A viscous mixture containing chiefly a metaphosphate with smaller proportions of a borate.

3. An inorganic lubricant containing chiefly metaphosphoric acid, together with smaller proportions of a metaphosphate.

4. An inorganic lubricant containing chiefly an alkali metal metaphosphate, together with smaller proportions of a borate.

5. An inorganic lubricant containing chiefly sodium metaphosphate, together with smaller proportions of borates.

6. An inorganic lubricant containing chiefly a water soluble metaphosphate compound together with a water soluble boric acid compound.

7. An inorganic lubricant containing chiefly a water soluble metaphosphate compound together with a water soluble borate compound and an orthophosphate compound.

8. An inorganic lubricant containing chiefly an alkali metal metaphosphate together with an alkali metal borate and phosphate compounds.

9. An inorganic lubricant containing chiefly sodium metaphosphate, together with sodium borate.

10. The herein described process of producing a non-hygroscopic inorganic lubricant which comprises boiling a mixture of a water solution of a metaphosphate compound and a borate compound until the mixture is brought to a viscous state.

11. The herein described process of producing a non-hygroscopic inorganic lubricant which comprises boiling a mixture of a water solution of a metaphosphate compound and a borate compound until the mixture is brought to a viscous state and allowing the viscous mixture to cool.

12. The herein described process of producing a non-hygroscopic inorganic lubricant which comprises evaporating a mixture of a water solution of an alkali metal metaphosphate and a borate with orthophosphoric acid until the mixture is brought to a viscous state.

13. An inorganic lubricant consisting of a highly viscous aqueous metaphosphate solution.

WILLIS A. BOUGHTON.